United States Patent
Pham et al.

(10) Patent No.: US 12,165,440 B1
(45) Date of Patent: *Dec. 10, 2024

(54) VEHICLE DIAGNOSTICS WITH INTELLIGENT COMMUNICATION INTERFACE

(71) Applicant: Innova Electronics Corporation, Irvine, CA (US)

(72) Inventors: Phuong Pham, Fountain Valley, CA (US); Ly Bach, Ho Chi Minh (VN); Van Nguyen, Ho Chi Minh (VN); Bruce Brunda, Irvine, CA (US)

(73) Assignee: Innova Electronics Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,811

(22) Filed: Jan. 22, 2024

Related U.S. Application Data

(63) Continuation of application No. 18/328,451, filed on Jun. 2, 2023, now Pat. No. 11,915,534.

(51) Int. Cl.
   *G07C 5/00* (2006.01)
   *G06F 40/40* (2020.01)
   *G07C 5/08* (2006.01)

(52) U.S. Cl.
   CPC .......... *G07C 5/008* (2013.01); *G06F 40/40* (2020.01); *G07C 5/0808* (2013.01); *G07C 5/0858* (2013.01); *G07C 2205/02* (2013.01)

(58) Field of Classification Search
   None
   See application file for complete search history.

(56) References Cited

U.S. PATENT DOCUMENTS

| | | | | |
|---|---|---|---|---|
| 9,401,054 | B2* | 7/2016 | Fountain | G07C 5/0808 |
| 9,881,428 | B2* | 1/2018 | Barfield, Jr. | G05B 23/0254 |
| 10,891,809 | B2* | 1/2021 | Liu | G10L 15/22 |
| 2013/0304306 | A1* | 11/2013 | Selkirk | G07C 5/0808 |
| | | | | 701/31.4 |
| 2021/0358496 | A1* | 11/2021 | Sukumar | G10L 13/047 |
| 2022/0180056 | A1* | 6/2022 | Hong | G06F 9/547 |
| 2022/0366765 | A1* | 11/2022 | Fujisawa | G06Q 50/10 |
| 2023/0259821 | A1* | 8/2023 | Travalini | G06N 3/0455 |
| | | | | 706/12 |

OTHER PUBLICATIONS https://www.theverge.com/2023/3/13/23637345/chatgpt-general-motors-gm-vehicle-voice-assistant-openai?showComments=1.
https://www.texausa.com/news/2023-05-02/texa-usa-releases-the-axone-voice.

* cited by examiner

*Primary Examiner* — Jean Paul Cass
*Assistant Examiner* — David Hatch
(74) *Attorney, Agent, or Firm* — Stetina Brunda Garred & Brucker

(57) ABSTRACT

A method of providing vehicle diagnostics may include receiving a first communication from a user, processing the first communication using a natural language processing (NLP) model to produce NLP model output including a sequence of words, extracting one or more keywords from the sequence of words, and instructing a data acquisition and transfer device (DAT) connected to an OBD port of a vehicle to perform a selected function based on the one or more keywords. The method may further include receiving diagnostic data from the DAT, the diagnostic data having been retrieved from the vehicle by the DAT in accordance with the selected function, and determining a diagnostic condition of the vehicle based on the diagnostic data.

31 Claims, 12 Drawing Sheets

VEHICLE DIAGNOSTICS WITH INTELLIGENT COMMUNICATION INTERFACE

CROSS-REFERENCE TO RELATED APPLICATIONS

This application is a continuation of U.S. patent application Ser. No. 18/328,451, filed Jun. 2, 2023 and entitled "VEHICLE DIAGNOSTICS WITH INTELLIGENT COMMUNICATION INTERFACE," the entire disclosure of which is incorporated by reference herein.

STATEMENT RE: FEDERALLY SPONSORED RESEARCH/DEVELOPMENT

Not Applicable

BACKGROUND

Automotive scan tools have the potential to empower vehicle owners to take matters into their own hands when it comes to vehicle diagnostics. Using a scan tool, a vehicle owner can retrieve diagnostic data from the vehicle's various systems and access a diagnostic database to derive a diagnostic condition of the vehicle including, for example, a most likely root cause of a problem that the vehicle owner is experiencing. In this way, the vehicle owner can streamline the process of servicing the vehicle and/or finding the necessary parts to repair the vehicle. As automotive diagnostic technology continues to improve, the functionality of scan tools has expanded to include various kinds of scans and data retrieval functions. The more functionality that scan tools have, the more powerful they are, but the more difficult they are to understand and use, especially in the hands of vehicle owners who are not professional auto mechanics. As a result, the full benefits of scan tools are not realized as vehicle owners either fail to take advantage of the scan tool's increased functionality or skip the scan altogether and take the vehicle in to the shop at the first sign of trouble, even in cases where professional service might not have been necessary.

By the same token, existing scan tools that are available for use by the general public, such as those found at kiosks in auto parts stores, may generally be configured to have only a limited set of features for ease of use by non-professionals. As such, the customers of these stores are unable to take advantage of the more powerful features that would be useful to more efficiently and accurately diagnose their vehicles.

BRIEF SUMMARY

The present disclosure contemplates various systems and methods for overcoming the above drawbacks accompanying the related art. A vehicle owner, technician, or other user of the disclosed subject matter may engage in ordinary conversation with the vehicle or with an application (e.g., a mobile app) associated with the vehicle that acts as a gateway connection between the user and the vehicle. It may be that the user is experiencing a problem with the vehicle or currently witnessing an unusual noise or other symptom of a possible vehicle defect. Or it may be that the user would like assistance with the vehicle or simply wants information about the vehicle. By processing the user's spoken (or typed) commands, questions, and concerns using a natural language processing (NLP) model, the disclosed app is able to derive appropriate scan tool feature functions to efficiently address the situation, without the user needing to know how to operate a scan tool or other data acquisition and transfer device (DAT). Even the most advanced scan tool functions and special purpose features may be automatically selected and/or recommended and explained to the user for confirmation as appropriate. The user can benefit from the full range of capabilities found in professional scan tools without any level of expertise or even a working knowledge of correct vehicle terminology. By employing NLP to expand upon the user's utterances and introduce related technical terminology, the system is able to derive keywords or other inputs for determining the most relevant scan tool feature functions and, ultimately, the diagnostic condition of the vehicle including the root cause of a problem, repair solutions, and/or replacement parts.

One aspect of the embodiments of the present disclosure is a computer program product comprising one or more non-transitory program storage media on which are stored instructions executable by one or more processors or programmable circuits to perform operations for providing vehicle diagnostics. The operations may comprise receiving a first communication from a user, processing the first communication using a natural language processing (NLP) model to produce NLP model output including a sequence of words, extracting one or more keywords from the sequence of words, and instructing a data acquisition and transfer device (DAT) connected to an OBD port of a vehicle to perform a selected function based on the one or more keywords.

Another aspect of the embodiments of the present disclosure is a method of providing vehicle diagnostics. The method may comprise receiving a first communication from a user, processing the first communication using an NLP model to produce NLP model output including a sequence of words, extracting one or more keywords from the sequence of words, and instructing a DAT connected to an OBD port of a vehicle to perform a selected function based on the one or more keywords.

Another aspect of the embodiments of the present disclosure is a system for providing vehicle diagnostics. The system may comprise a mobile device operable to receive a first communication from a user, process the first communication using an NLP model to produce NLP model output including a sequence of words, and extract one or more keywords from the sequence of words. The system may further comprise a DAT in communication with the mobile device and connected to an OBD port of a vehicle. The DAT may be operable to perform a selected function based on the one or more keywords.

Another aspect of the embodiments of the present disclosure is a system for providing vehicle diagnostics. The system may comprise one or more servers operable to receive a first communication from a user, process the first communication using a natural language processing (NLP) model to produce NLP model output including a sequence of words, and extract one or more keywords from the sequence of words. The system may further comprise a DAT in communication with the one or more servers and connected to an OBD port of a vehicle. The DAT may be operable to perform a selected function based on the one or more keywords.

The operations and/or methods of any of the above aspects of the embodiments described herein may comprise receiving diagnostic data from the DAT, the diagnostic data having been retrieved from the vehicle by the DAT in accordance with the selected function, and determining a diagnostic condition of the vehicle based on the diagnostic data. Determining the diagnostic condition may include uploading the diagnostic data to one or more servers and receiving the diagnostic condition from the one or more servers. The diagnostic condition may be derived based on a historical database of vehicle-specific diagnostic data and associated diagnostic conditions and/or using artificial intelligence (AI). The operations and/or methods may comprise deriving a reliability index associated with the diagnostic condition. The operations and/or methods may comprise, in response to the reliability index being below a threshold, instructing the DAT to perform a special function test or presenting to the user an option to instruct the DAT to perform a special function test. The special function test may be configured to generate additional diagnostic data that supports or refutes the determined diagnostic condition. The diagnostic condition of the vehicle may comprise an indication of a repair solution and/or an indication of a replacement part.

Processing the first communication using the NLP model may include supplementing the first communication with a context related to the vehicle. The context may include identifying information of the vehicle, past user communications, state information of the vehicle, and/or environmental information that may be captured from various sensors including accelerometers and other sensors found in typical smartphones and tablets.

The operations and/or methods may comprise determining one or more proposed functions based on the one or more keywords, receiving a second communication from a user, and processing the second communication to determine the selected function from among the one or more proposed functions. Determining the one or more proposed functions may include mapping the one or more keywords to the one or more proposed functions. Determining the one or more proposed functions may include inputting the one or more keywords to a machine learning model whose output indicates the one or more proposed functions (e.g., using artificial intelligence). The one or more proposed functions may include a special function test. The operations and/or methods may comprise presenting a presumed diagnostic condition to the user. The special function test may be configured to generate additional diagnostic data that supports or refutes the presumed diagnostic condition.

The operations and/or methods may comprise determining the selected function by mapping the one or more keywords to the selected function.

The operations and/or methods may comprise determining the selected function by inputting the one or more keywords to a machine learning model whose output indicates the selected function.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of systems and methods for providing vehicle diagnostics using an intelligent communication interface. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
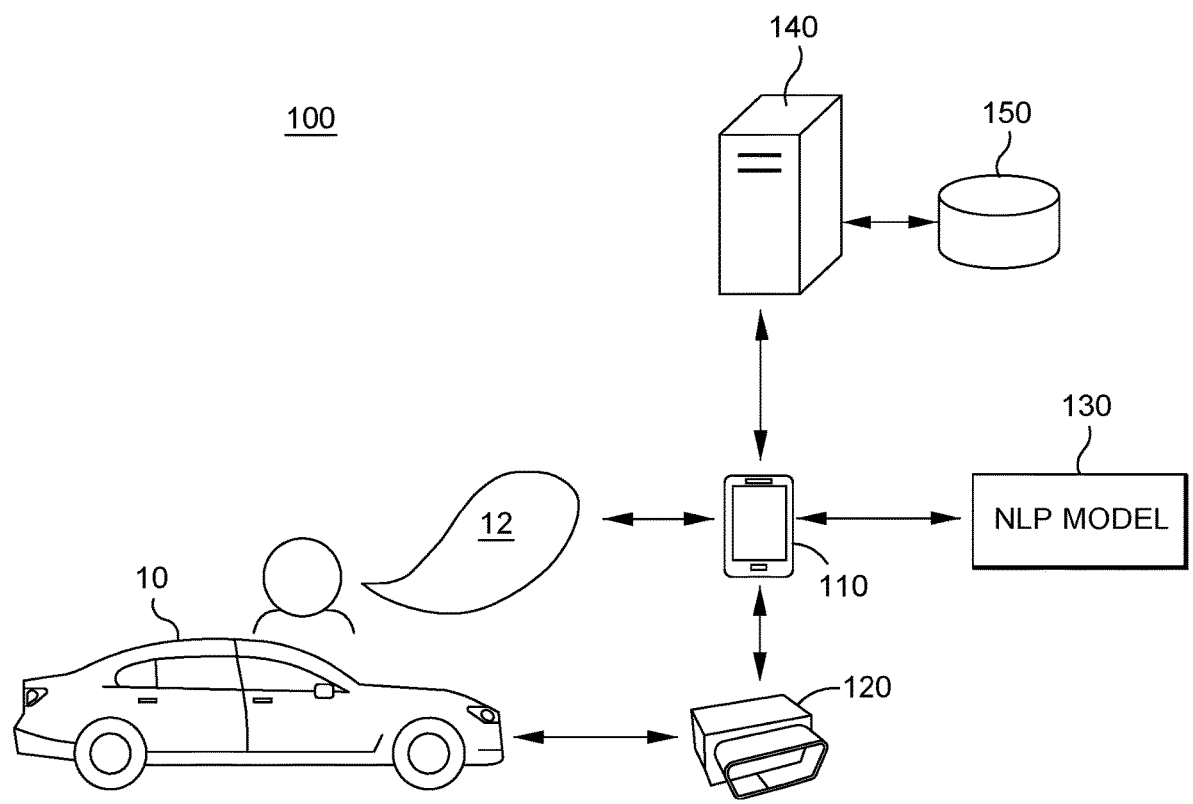
FIG. 1 shows a system for providing vehicle diagnostics according to one or more embodiments of the present disclosure.

FIG. 1 shows a system 100 for providing vehicle diagnostics according to one or more embodiments of the present disclosure. The system 100 may allow a vehicle owner with little or no automotive technical knowledge or experience with scan tool feature functionality to easily locate and initiate the most effective scan tool functions quickly and efficiently when diagnosing the vehicle 10. Referring also to the operational flow of FIG. 2, a diagnostic methodology using the system 100 may begin with receiving a first communication 12 from the vehicle owner or other user (step 210). For example, in a case where the diagnostic methodology is performed by a mobile device 110 such as a smartphone or tablet having an installed application (e.g., a mobile app), the application may enable the mobile device 110 to receive the user's communication 12 via a microphone thereof (in the case of a spoken communication 12) or via a wireless communication interface thereof (in the case of a communication 12 in the form of a text message). While the communication modality (e.g., speech, typed text, etc.) may depend on the particular scenario, it is contemplated that the communication 12 may advantageously comprise natural language, such that the user may be able to converse freely with the mobile device 110 as opposed to being constrained to specific words and phrases that are preprogrammed into the application. Under the control of the app, the mobile device 110 may then, as described in more detail below, initiate one or more functions of a data acquisition and transfer device (DAT) 120 that may be connected to an on-board diagnostics (OBD) port of the vehicle 10, e.g., a data link connector (DLC) port. The DAT 120 may be a dongle that plugs into the OBD port or a scanner or scan tool that connects to the OBD port via a cable, for example, to collect diagnostic data from an onboard computer (e.g., an electronic control unit or ECU) of the vehicle 10 for diagnostic analysis. The mobile device 110 may communicate with the DAT 120 using a shortrange wireless communication protocol (e.g., Bluetooth) or a wired connection, for example.

Given that the user may be inexperienced with automotive technology and scan tool functionality, the first communication 12 uttered by the user may not be well formulated. It may, for example, be vague, incomplete, or ambiguous and/or may use unconventional (or incorrect) terminology. Example communications 12 may include "The car won't start" or "What's going on with my brakes?" or may provide even less context such as "What's that clicking sound?" or "What does this light mean?" Even given the capability of parsing these questions into words (e.g., by an automatic speech recognition or speech to text algorithm), these communications 12 lack necessary information that would, in principle, be needed to meaningfully instruct a DAT 120. To this end, after the first communication 12 is received from the user, the diagnostic methodology of FIG. 2 may proceed with processing the communication 12 using a natural language processing (NLP) model 130 to produce NLP model output (step 220). In a readily deployable embodiment of the disclosed subject matter, it is envisioned that a pretrained machine learning model such as a general purpose chatbot or virtual assistant (e.g., OpenAI's ChatGPT) may serve as the NLP model 130. The user's communication 12 may be uploaded or otherwise provided by the mobile device 110 as input to the NLP model 130, and the NLP model 130 may create NLP model output including a sequence of words, typically in the form of a human-readable response to the communication 12 that attempts to answer the user's question or otherwise address the user's need. As can be appreciated, such NLP model output may to varying degrees (depending on the particular NLP model 130) be thorough, detailed, lengthy, and/or simulate natural language, but may not necessarily be reliably accurate. This may be understood to be due to the nature of natural language processing, which may be thought of as a tool for mimicking responses to similar questions without truly "knowing" the answer to the question posed. In response to the user's communication 12 of "The car won't start," for example, the NLP model output may be something like, "Here is a list of possible reasons that a vehicle won't start: the key fob has low battery or is not in range; the vehicle is low on fuel; the vehicle battery is depleted or faulty and may need to be replaced; there is a problem with the alternator; there is a problem with the timing belt; . . . " etc. As described in more detail below, the system 100 may make use of the NLP model output not for its conventional purpose of providing an answer or solution for the user but, rather, as a means of elaborating upon and finetuning the user's original communication 12 for use in deriving one or more suitable scan tool functions to perform.

In some cases, the step of processing the user's communication 12 using the NLP model 130 may include supplementing the communication 12 with a context related to the vehicle 10. Given that the NLP model 130 may be a general-purpose model that is not designed specifically for dialogue about vehicles, it may be especially advantageous for the system 100 to provide a context for questions that would otherwise not be recognizable as having to do with a vehicle, such as "What's that clicking sound?" or "What does this light mean?" In a relatively simple embodiment, for example, the mobile device 110 (e.g., under the control of the app) may simply append a phrase such as "in a vehicle" or "for vehicle diagnostics" to the user's communication 12. Thus, "What's that clicking sound?" or "What does this light mean?" may become "What's that clicking sound in a vehicle?" or "What does this light mean in a vehicle?" A context like this, which may have universal applicability for any envisioned communication 12 of the user, may be redundant in some cases (e.g., "The car won't start" becomes "The car won't start in a vehicle") but nondetrimental, while providing important information to the NLP model 130 in many cases where the context would otherwise not be clear. More specific contexts are also contemplated, such as where the context includes identifying information of the particular vehicle 10 in question. Identifying information of the vehicle 10 may include, for example, year/make/model/engine/trim information, which may be stored in a user profile associated with the app (e.g., locally or on a server), derived from a VIN retrieved from the vehicle 10 by the DAT 120, or, in some cases, deduced by the system 100 from other diagnostic data of the vehicle 10. By providing identifying information of the particular vehicle 10 to the NLP model 130 together with the user's communication 12, it may be appreciated that the resulting NLP model output may be more relevant. Other types of context that may be used to supplement the user's communication 12 are also contemplated, such as a previous communication 12 of the user related to the vehicle 10 or a state (e.g., ON/OFF, vehicle speed, gear) of the vehicle 10, which may be derived from diagnostic data retrieved from the vehicle 10 by the DAT 120, for example. In some cases, a context may include environmental data derived from one or more sensors (e.g., a vapor sensor) that may be present in or near the vehicle 10 including sensors or other components of the mobile device 110. For example, an accelerometer built into the mobile device 110 may indicate that acceleration is not smooth or that the vehicle, potentially pointing to a fuel line function or that the vehicle 10 is experiencing a bumpy ride, suggesting a tire pressure issue.

As noted above, the system 100 may make use of the NLP model output as a means of elaborating upon and finetuning the user's original communication 12. In this regard, the operational flow of FIG. 2 may continue with extracting one or more keywords from the sequence of words included in the NLP model output (step 230). For example, in the above scenario where the user said, "The car won't start," it was envisioned that the NLP model output might be something like, "Here is a list of possible reasons that a vehicle won't start: the key fob has low battery or is not in range; the vehicle is low on fuel; the vehicle battery is depleted or faulty and may need to be replaced; there is a problem with the alternator; there is a problem with the timing belt; . . . " etc. In this instance, the mobile device 110 might extract, for example, "key fob," "low," "battery," "range," "fuel," "depleted," "alternator," "timing belt" (note that the word pairs "key fob" and "timing belt" may be tokenized as key words using a tokenization algorithm that recognizes them as two-word terms based on the statistical occurrences of the words), and/or might similarly extract keywords that include phrases such as "vehicle won't start," "low battery," "low on fuel," "battery is depleted," etc. The resulting list of keywords may represent a brainstorm of symptoms and potential diagnostic conditions that are closely related to the user's original communication 12. In this way, the NLP model output may be thought of not only as a response to the user's communication 12 (which may be the conventional purpose of the NLP model output as used in other contexts) but also, from the perspective of the system 100, as a detailed reformulation of the underlying concern that prompted the user's communication 12 or, in other words, as a rephrasing of the user's request. That is, the system 100 may be less interested in the articulated response output by the NLP model 130 and more interested in mining the NLP model output for raw associations (in the form of keywords) to expand on and develop the user's original communication 12. The sequence of words output by the NLP model 130 may thus be repurposed as input to a computer-implemented vehicle diagnostic methodology rather than presented to a human user as may be the original purpose of third-party NLP model output, for example.

Figure 2:
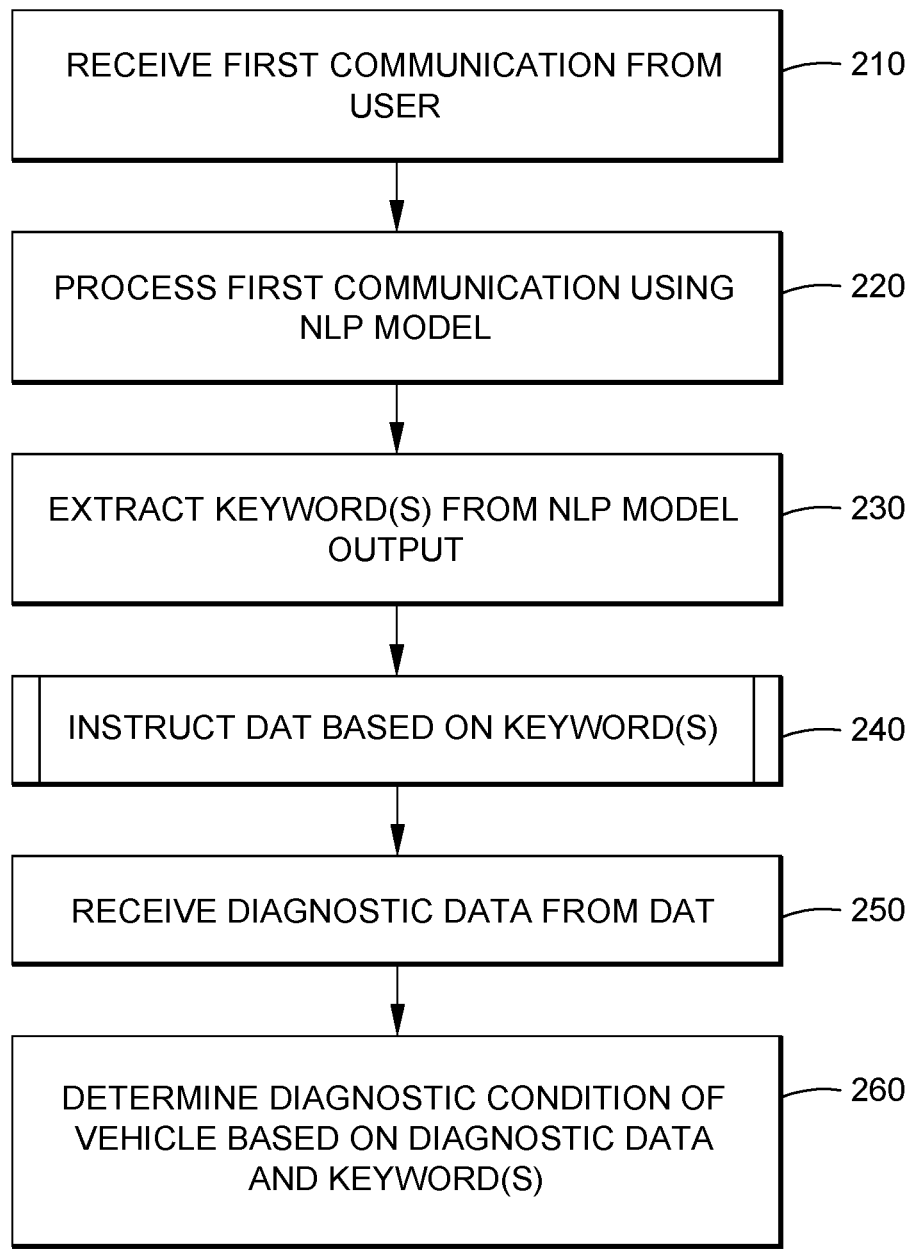
FIG. 2 shows an operational flow for providing vehicle diagnostics according to one or more embodiments of the present disclosure.

With the keyword(s) having been extracted from the NLP model output, the operational flow of FIG. 2 may continue with instructing the DAT 120 based on the keyword(s) (step 240). The mobile device 110 (e.g., under the control of the app) may, for example, communicate with the DAT 120 via a wired or wireless connection to instruct the DAT 120 to perform a selected function based on the keyword(s). The available functions may depend on the manufacturer, with functions being added or optimized from time to time, and may include, by way of example, any or all of the following scan tool functions or variants thereof: read and clear OBD fault codes, read freeze frame, read and clear original equipment manufacturer (OEM) fault codes, read OBD live data, read OEM live data, monitor status, drive cycle procedure, service check (e.g., warning light status, brake pad check, battery status, oil life status, transmission temperature, etc.), tire pressure monitoring system (TPMS) pressure and status, active test, special function, workshop tools, etc. Selection of scan tool functions based on the keyword(s) may be done by mapping the keyword(s) to the functions. For example, a set of possible functions indexed by keywords (e.g., in the form of a lookup table or decision tree) may be stored locally on the mobile device 110 and managed by the app or may be stored remotely and accessed by the app through communication with one or more servers 140 (e.g., over the Internet via a cellular or WiFi network, for example). By using the keyword(s) as an index, the app may select one or more functions. For example, the keywords "battery," "low battery," "vehicle won't start," "battery is depleted," etc. may indicate that the DAT 120 should perform a function to check battery status, while the keywords "check engine," "check engine light," etc. may indicate that the DAT 120 should perform function(s) to read one or more types of diagnostic data from the vehicle 10. Additional example keywords might include "ABS code," "read tire pressure," "test battery," "check brake pad," "SRS light," "ignition," which may be matched or otherwise mapped to related scan tool functions. Instead of or in addition to using the keywords as an index, the keywords may be input to a machine learning model whose output indicates the one or more function(s), with the machine learning model having been trained on sets of keywords (and possibly associated diagnostic data) to generate a relevant set of function(s). In this way, artificial intelligence (AI) may be used to associate various keywords or combinations of keywords (which may be representative of vehicle-related concepts) with relevant scan tool functions. Environmental and other context data as described above, such as contemporaneously captured sensor data of the mobile device 110, may also be input to the machine learning model to improve the relevance of the determined function(s).

Figure 3:
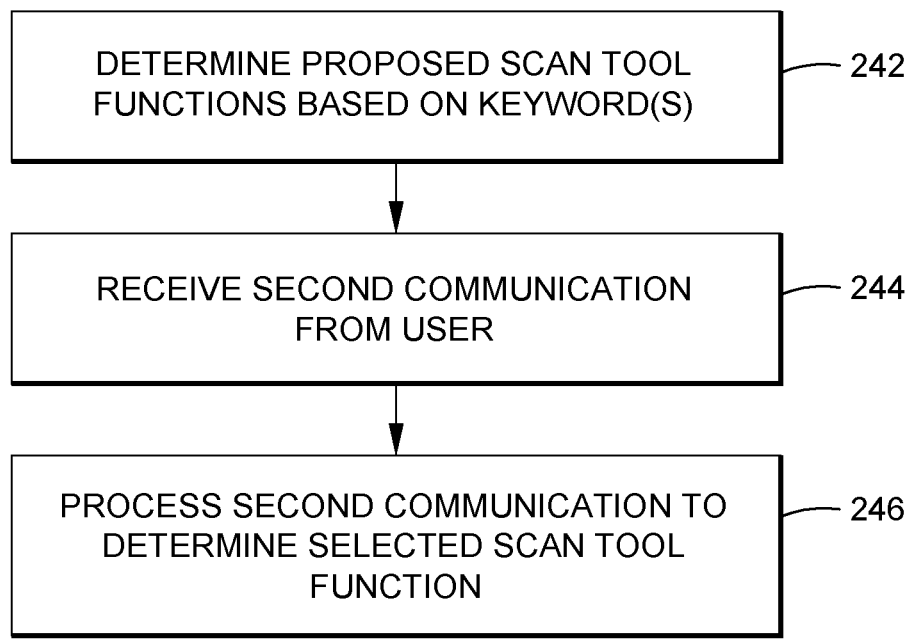
FIG. 3 shows a sub-operational flow of step 240 in FIG. 2.
Figure 4:
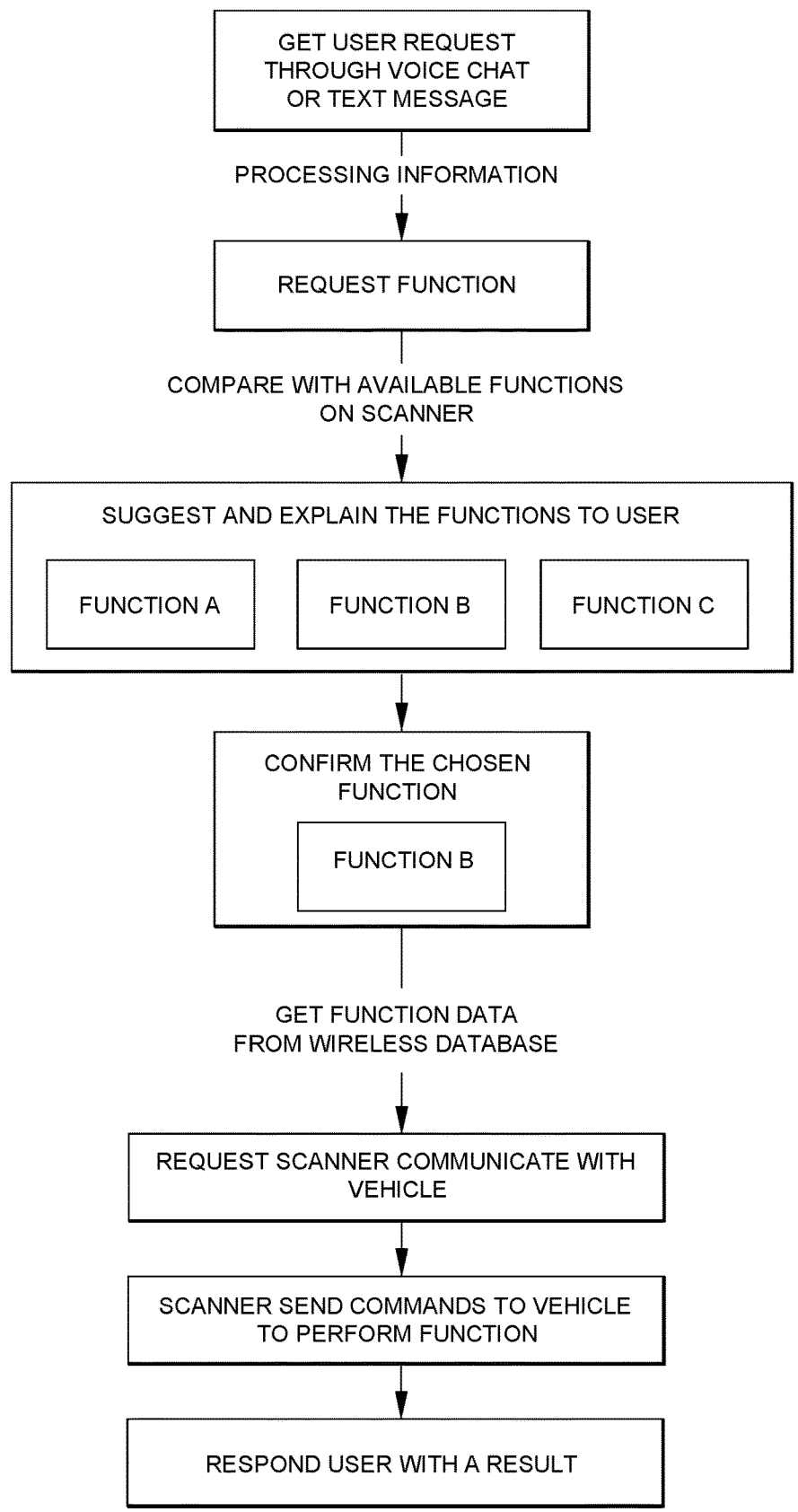
FIG. 4 shows a flow chart describing an example application of the system of FIG. 1 and/or the operational flow of FIG. 2.

To further resolve ambiguity and/or allow the user to participate in the diagnostic procedure, it is contemplated that the system 100 (e.g., the app) may propose one or more scan tool functions to the user for selection or confirmation. In this regard, FIG. 3 shows an example sub-operational flow of step 240, which may begin with determining one or more proposed functions based on the one or more keywords (step 242). The proposed functions may be presented to the user by the system 100 (e.g., via the app), on screen or preferably by verbal communication with the user (e.g., using a speaker of the mobile device 110). In addition to the names of the proposed functions, the system 100 may provide the user with an explanation of each proposed function so that the user can make an informed choice. The sub-operational flow of FIG. 3 may continue with receiving a second communication 12 from the user, which may indicate a selection and/or confirmation of one or more of the proposed functions. Like the first communication 12 that initiated the process, the second communication 12 may be speech, typed text, etc. The second communication 12 may be processed by the system 100 to determine a selected function (step 246), which may be used for instructing the scan tool 120 in step 240 of FIG. 2. In a relatively simple embodiment, the second communication 12 may include a selection from an enumerated menu of options (e.g., by making a selection on screen or repeating a specific word or phrase in the case of spoken communication with the app), such that there is little or no possibility of misunderstanding the user's intent. The processing of the second communication 12 may in this case be straightforward (i.e., selecting the scan tool function that is unambiguously identified/confirmed by the user), though it may still involve an automatic speech recognition or speech to text algorithm, for example. Alternatively, natural language processing may be used to interpret the second communication 12, allowing the user more flexibility with his/her wording. A flow chart describing an example application of the operational flow of FIG. 2 including the sub-operational flow of FIG. 3 is shown in FIG. 4, in which the user confirms one of three proposed functions ("Function A," "Function B," and "Function C") for instructing the DAT 120.

By virtue of the above methodology (with or without the user selection/confirmation described in relation to FIG. 3), the system 100 may allow a user with little or no understanding of scan tool functionality to effectively make use of modern scan tool functions, even as they may be continually expanded and updated by the manufacturer of the DAT 120. The user may simply talk to (or text with or otherwise communicate with) the app, which, from the user's perspective, may feel like the user is talking to the vehicle 10 as if it were a person. Owing to the use of the NLP model 120 to expand upon the user's vague or ambiguous utterances as described above, it may be entirely unnecessary for the user to know specific commands, and no particular level of detail or sophistication may be needed in the user's communication 12. The user may have the impression that the system 100 understands what the user means, no matter how imprecise the user's concern or request may be.

Once the DAT 120 has been instructed in step 240 of FIG. 2 and one or more scan tool functions have been initiated by the DAT 120 (see FIG. 1), the results of the function(s) may be used to diagnose the vehicle 10. In this regard, it may be appreciated that the DAT 120 or the mobile device 110 may, in general, upload diagnostic data collected from the vehicle 10 to the one or more servers 140, which may derive a diagnostic condition of the vehicle 10 from the uploaded diagnostic data by comparing the uploaded diagnostic data with data (e.g., historical data) stored in one or more diagnostic databases 150. The diagnostic condition of the vehicle 10 may include, for example, information about the root cause of a problem that the vehicle 10 is experiencing and/or an indication of one or more repair solutions or replacement parts for addressing the problem. Exemplary diagnostic methods, including the use of such diagnostic data to arrive at a most likely root cause and repair solution as well as vehicle-specific replacement parts, are described in the following U.S. patent documents, each of which is owned by Innova Electronics Corporation of Irvine, California: U.S. Pat. No. 6,807,469, entitled AUTO DIAGNOSTIC METHOD AND DEVICE, U.S. Pat. No. 6,925,368, entitled AUTO DIAGNOSTIC METHOD AND DEVICE, U.S. Pat. No. 7,620,484, entitled AUTOMOTIVE MOBILE DIAGNOSTICS, U.S. Pat. No. 8,068,951, entitled VEHICLE DIAGNOSTIC SYSTEM, U.S. Pat. No. 8,019,503, entitled AUTOMOTIVE DIAGNOSTIC AND REMEDIAL PROCESS, U.S. Pat. No. 8,370,018, entitled AUTOMOTIVE DIAGNOSTIC PROCESS, U.S. Pat. No. 8,909,416, entitled HANDHELD SCAN TOOL WITH FIXED SOLUTION CAPABILITY, U.S. Pat. No. 9,014,908, entitled MULTI-STAGE DIAGNOSTIC SYSTEM AND METHOD, U.S. Pat. No. 9,142,066, entitled MULTI-STAGE DIAGNOSTIC SYSTEM AND METHOD, U.S. Pat. No. 9,026,400, entitled DIAGNOSTIC PROCESS FOR HOME ELECTRONIC DEVICES, U.S. Pat. No. 9,177,428, entitled PREDICTIVE DIAGNOSTIC METHOD, U.S. Pat. No. 9,646,432, entitled HAND HELD DATA RETRIEVAL DEVICE WITH FIXED SOLUTION CAPABILITY, U.S. Pat. No. 9,824,507, entitled MOBILE DEVICE BASED VEHICLE DIAGNOSTIC SYSTEM, U.S. Pat. No. 10,643,403, entitled PREDICTIVE DIAGNOSTIC METHOD AND SYSTEM, U.S. Pat. No. 11,068,560, entitled METHOD OF PROCESSING VEHICLE DIAGNOSTIC DATA, U.S. Pat. No. 11,270,529, entitled SYSTEM AND METHOD FOR PROACTIVE VEHICLE DIAGNOSIS AND OPERATIONAL ALERT, and U.S. Pat. No. 11,158,141, entitled SYSTEM AND METHOD FOR PROACTIVE VEHICLE DIAGNOSIS AND OPERATIONAL ALERT, the entire contents of each of which is expressly incorporated by reference herein. The operational flow of FIG. 2 may thus continue with receiving diagnostic data from the DAT 120 (step 250), the diagnostic data having been retrieved from the vehicle 10 by the DAT 120 in accordance with the selected function(s) of step 240, and determining a diagnostic condition of the vehicle 10 (step 260). Advantageously, the system 100 (e.g., the app) may determine the diagnostic condition based on the diagnostic data and, in some cases, further based on the one or more keywords that were extracted from the NLP model output in step 230. In this way, the diagnostic analysis performed by the system 100 may take into account both the expanded brainstorm of symptoms and potential diagnostic conditions derived by the NLP model 130 from the user's original communication 12 and the actual diagnostic data of the vehicle 10 collected by the DAT 120 for a more accurate and relevant diagnosis. Environmental and other context data as described above, such as contemporaneously captured sensor data of the mobile device 110, may also be taken into account to further improve the results. For example, diagnostic data might include airbag sensor data indicating that the airbag was inflated, which may be corroborated by accelerometer data of the mobile device 110 indicating that the vehicle 10 experienced a sudden change in velocity suggestive of a collision. By corroborating the diagnostic data with environmental data in this way, a situation may be avoided where the family members of a passenger are notified prematurely of a crash when really there was simply a faulty airbag sensor.

In lieu of, or in addition to the above-described techniques for deriving a diagnostic solution or diagnostic condition based on use of a vehicle specific historical database, artificial intelligence (AI) may be used to recognize associations between certain vehicle data (e.g., live data, patterns of live data and static data), NLP model output, and/or other vehicle operational and environmental conditions (e.g., sensed vibrations, sounds, vapors, temperatures, etc.) with the diagnostic solution or condition, thus enabling the determination of a diagnostic solution or condition without the need to reference the historical database. For example, a machine learning model may be trained using historical data such as the historical data stored in the diagnostic database(s) 150, such that the machine learning model becomes increasingly capable of associating patterns of input data with diagnostic conditions. Subsequently, for a given set of new input data, the system 100 may derive the diagnostic condition(s) of the vehicle 10 using the machine learning model without there being any need to further consult the historical data. The AI may further be operative to identify external resources suitable to further inform the user with respect to the diagnostic solution and establish communication with such resources via an appropriate and available communication pathway, such as a cellphone enabled pathway or a V2X pathway to V2X service providers and associated resources. That functionality may proceed autonomously in response to receipt of the vehicle data, in response to an evaluation of the urgency of the vehicle diagnostic solution, or on-demand, in response to a user input. Another exemplary application of the AI enabled diagnostic process would be to support and facilitate the evolution of advanced driver-assistance systems (ADAS), in relation to installation, testing and/or monitoring of those systems during driving conditions.

It is noted that all or a portion of the operational flow of FIG. 2 may be performed by the mobile device 110 with installed app as described above, in which case the mobile device 110 may, for example, process the first communication using the NLP model in step 220 by communicating with third-party computer(s) where the NLP model 130 might in some implementations be located. By the same token, the mobile device 110 may, for example, determine scan tool function(s) in step 242 or determine the diagnostic condition of the vehicle 10 in step 260 by communicating with one or more servers 140 to request needed information and/or analysis with reference to one or more databases 150, to the extent that such resources are not stored locally on the mobile device 110. In some implementations, the server(s) 140 may associate the vehicle 10 with the user of the mobile application through the use of a user profile linked to the VIN of the vehicle 10 as described in the following U.S. patent documents, each of which is owned by Innova Electronics Corporation of Irvine, California: U.S. Pat. No. 11,335,139, entitled SYSTEM AND METHOD FOR SELECTIVE VEHICLE DATA RETRIEVAL, U.S. Pat. No. 11,455,841, entitled SYSTEM AND METHOD FOR SELECTIVE VEHICLE DATA RETRIEVAL, and U.S. Patent Application Pub. No. 2023/0063381, entitled SYSTEM, METHOD, AND COMPUTER PROGRAM PRODUCT FOR PROVIDING APPLICATION-BASED ASSISTANCE WITH VEHICLE EMISSION TEST COMPLIANCE, the entire contents of each of which is expressly incorporated by reference herein. Just as all or a portion of the operational flow of FIG. 2 may be performed by the mobile device 110, it is contemplated that all or a portion of the operational flow of FIG. 2 may be performed by the one or more servers 140. In this regard, the server(s) 140 may communicate with the DAT 120 and/or access the NLP model 130 directly or via the app installed on the mobile device 110.

Figure 5A:
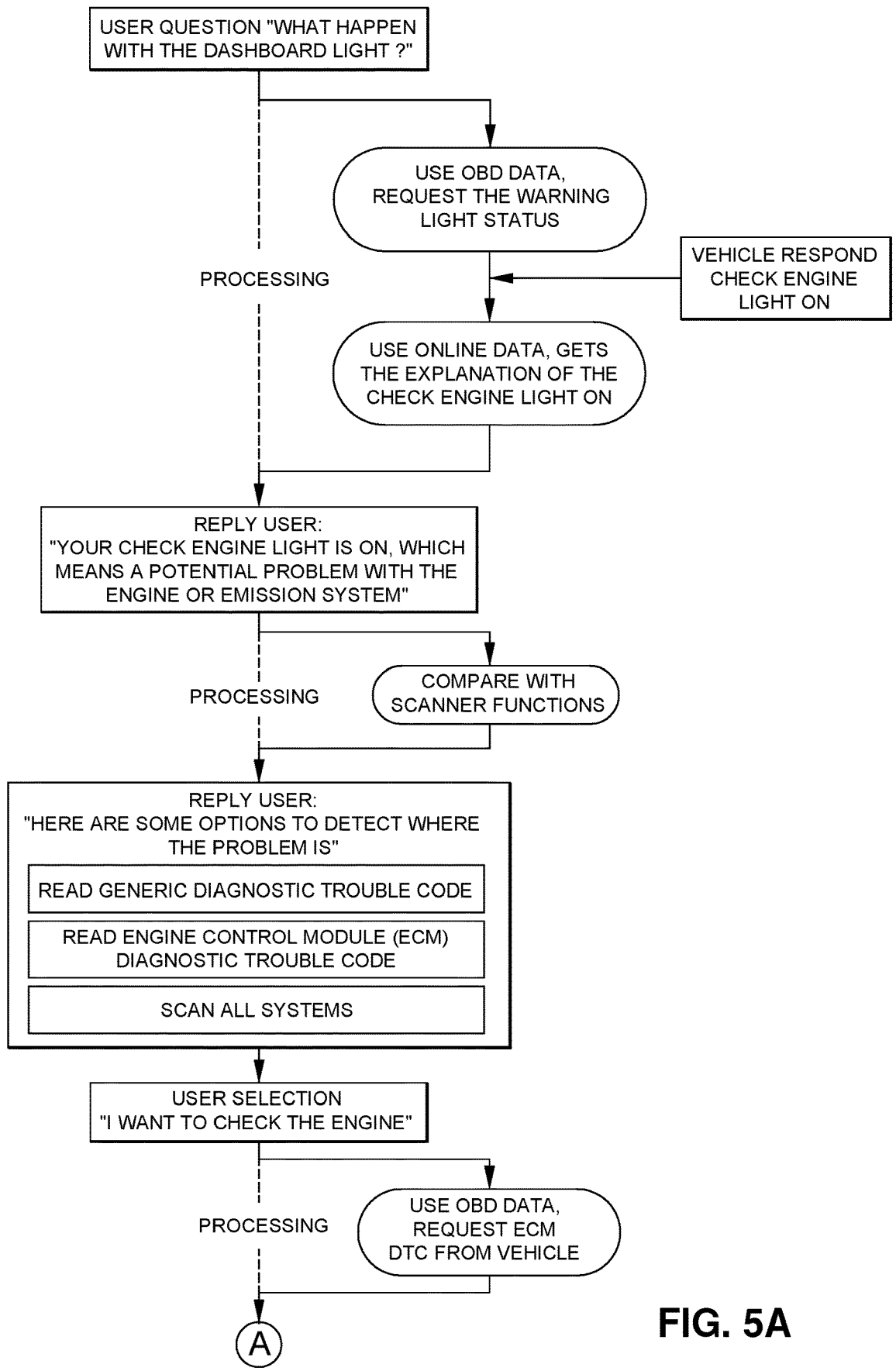
FIG. 5A shows a first part of a flow chart describing another example application of the system of FIG. 1 and/or the operational flow of FIG. 2.
Figure 5B:
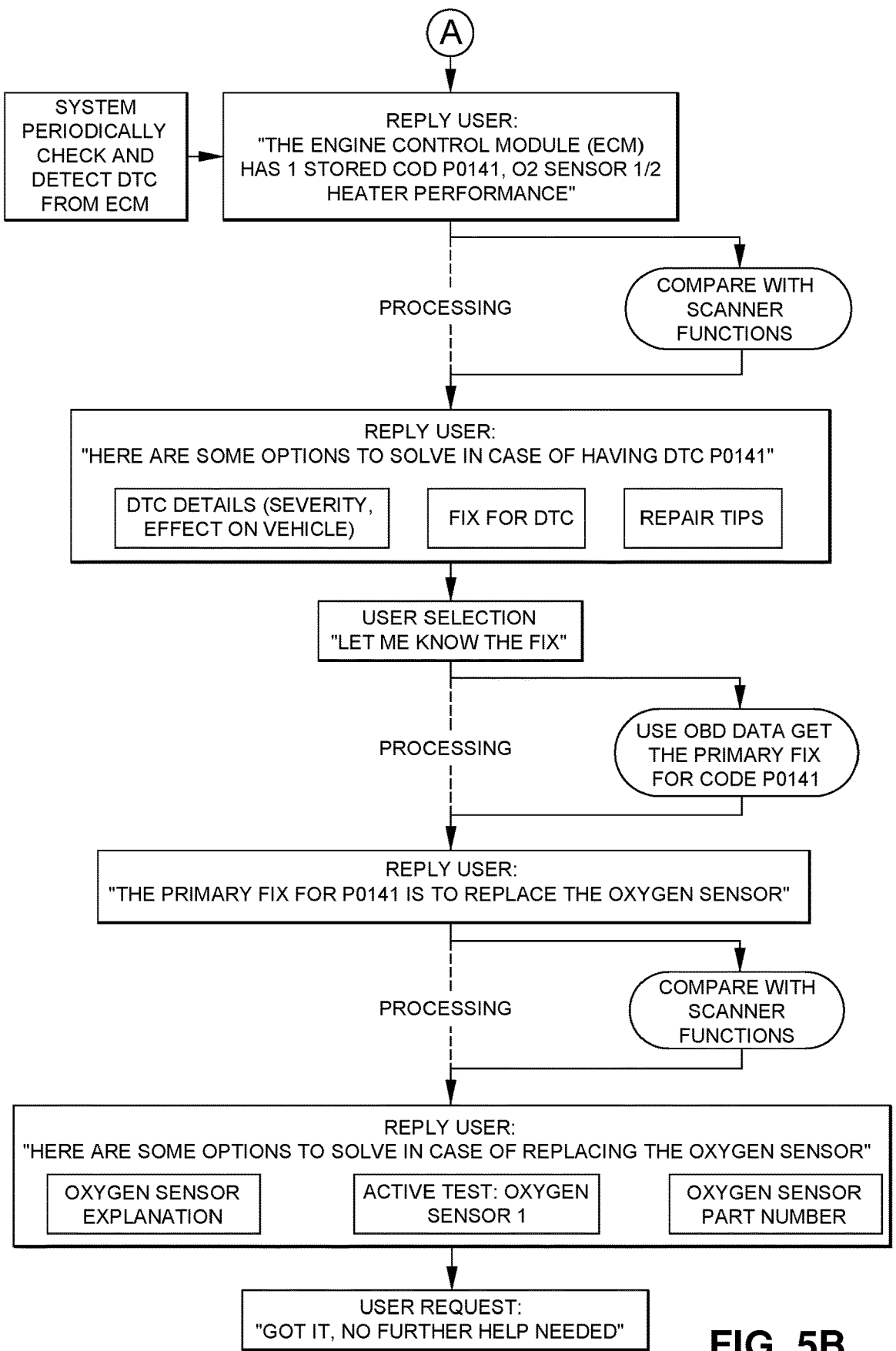
FIG. 5B shows a second part of the flow chart of FIG. 5A.

All or portions of the above-described operational flow of FIG. 2 may be performed iteratively to enable a back-and-forth conversation between the user and the system 100. An extended example showing one such iterative application of the disclosed subject matter is shown in the flow chart of FIGS. 5A and 5B. The example may begin with the user detecting that there is a light illuminated on the dashboard and asking what is happening with the dashboard light. From the user's perspective, the system 100 (e.g., the app) may reply verbally to the user, "Your Check Engine light is ON, which means a potential problem with the engine or emissions system," followed by "Here are some options to detect where the problem is: Read Generic Diagnostic Trouble Code (DTC), Read Engine Control Module (ECM) Diagnostic Trouble Code (DTC), Scan All Systems," at which point the system 100 may wait for further input from the user. Behind the scenes, the processing steps may involve one or more iterations of the operational flow described in relation to FIG. 2 or portions thereof. To process the initial question about the dashboard light, the mobile device 110 with the installed app may initially use OBD data to determine which dashboard light is currently lit by requesting a warning light status using the DAT 120. For example, the initial communication 12 "What happen with the dashboard light?" may be processed using the NLP model 130 to derive keywords, and the keywords may be mapped to the scan tool function of requesting the warning light status. Alternatively, in some implementations the app may first check whether the initial question itself has suitable keywords (e.g., "dashboard light") for selecting a suitable scan tool function, in which case the NLP model 130 may not be needed for this initial step. Upon receiving the OBD data from the vehicle 10 indicating that the check engine light is ON, the app may perform further processing to provide additional information to the user and come up with a list of relevant scan tool functions as shown in FIG. 4A. Advantageously, the system 100 may derive this explanatory information and proposed scan tool functions by supplementing the user's initial communication 12 with the actual vehicle data indicating that the check engine light is on, processing the resulting query using the NLP model 130, deriving keyword(s) from the NLP model output, and communicating with one or more server(s) 140 to retrieve the information and proposed functions from one or more diagnostic databases 150.

In response to a second communication 12 from the user selecting one of the proposed scan tool functions, "I want to check the engine" (which may entail a simple selection from an enumerated menu of options or involve further natural language processing as described above), the system 100 (e.g., the app) may initiate the scan tool function of "request ECM DTC" from the vehicle 10 as shown in FIG. 4A, after which the app may reply to the user to provide the result of the function as shown in FIG. 4B, "The Engine Control Module (ECM) has 1 stored code P0141, O2 Sensor 1/2 Heater Performance." To arrive at this result, the app may again communicate with the one or more server(s)/ database(s) 140, 150 to upload the DTCs (along with vehicle identifying information derived from the VIN) and determine an associated diagnostic condition of the vehicle 10 (e.g., for the specific year/make/model/engine/trim). The app may again present the user with further options to pursue when having DTC P0141, some or all of which may involve additional scan tool functions as may be derived from the combined diagnostic data, user communication(s) 12, and/or keyword(s) extracted from NLP model output. The user may then select from these options ("DTC Details (Severity, Effect on Vehicle), Fix for DTC, Repair Tips") as shown ("Let me know the fix"), and the system 100 may retrieve the fix from the server(s)/database(s) 140, 150 and announce or otherwise present it to the user ("The Primary Fix for P0141 is to replace the oxygen sensor").

In this way, the system 100 may determine the diagnostic condition of the vehicle 10 in accordance with step 260 of FIG. 2 and present the diagnostic condition to the user, verbally and/or on screen on the mobile device 110. Depending on the available functions of the DAT 120, the user may continue to drill down and perform additional diagnostic functions as may be recommended by the system 100 and selected or confirmed by the user. As shown, for example, the flow chart of FIG. 4B continues with the presentation to the user of options for further processing (which may be retrieved from the server(s)/database(s) 140, 150 as described above): "Here are some options to solve in case of replacing the oxygen sensor: Oxygen Sensor Explanation, Active Test: Oxygen Sensor1, Oxygen Sensor Part Number." The user may, for example, choose to conduct a special function test such as "Active Test: Oxygen Sensor1," which would result in the system 100 retrieving more specific diagnostic data from the vehicle 10 using the DAT 120, which would then be used to retrieve a more specific diagnostic condition of the vehicle 10 for presentation to the user. The more specific diagnostic data may include, for example, live data, which may be found to support or refute a presumed diagnostic condition (such as a faulty oxygen sensor). In this way, an iterative application of the disclosed subject matter may enable a conversational guided diagnostic procedure, with the user able to drill down as desired to delve further into potential root causes through a back-and-forth dialogue with the system 100. In the example of FIG. 4B, the user instead chooses to exit the conversation by saying "Got it, no further help needed."

As noted above, the user may be presented with the option of performing a special function test as part of a dialogue with the system 100. For example, a special function test may be performed that is associated with a vehicle component that is relevant to the diagnostic condition determined or presumed by the system 100. In this regard, the diagnostic condition or solution derived by the system 100 (e.g., by operation of the DAT 120, user communications 12, and/or other data sources) can be confirmed by guided diagnostic testing, in a manner as set forth in U.S. patent application Ser. No. 18/328,289, entitled SYSTEM AND METHOD FOR GUIDED VEHICLE DIAGNOSTICS, filed on Jun. 2, 2023 and owned by Innova Electronics Corporation of Irvine, California, the entire contents of which is expressly incorporated by reference. It is contemplated that the operations performed by the system 100 (e.g., by the app and/or server(s) 140) may include deriving a reliability index associated with the presumed diagnostic condition of the vehicle. The reliability index may be a score (e.g., a numerical score) that quantifies a confidence in the diagnostic condition (or any other result) that is determined by the system 100 and may be based on, for example, historical data indicative of how often the same diagnostic condition (or other result) was found to be accurate in the same or similar vehicles under the same or similar circumstances in the past. In response to the reliability index being below a threshold, the system 100 (e.g., the app) may instruct the DAT 120 to perform a special function test (e.g., autonomously) or may present the user with an option to instruct the DAT 120 to perform a special function test, with the special function test being configured to generate additional diagnostic data that supports or refutes the determined diagnostic condition (e.g., by the collection of live data). A low reliability index may cause the system 100 to present options for performing a special function test, whereas a high reliability index (e.g., above some threshold) may cause the system 100 to bypass that option and proceed under the assumption that the presumed diagnostic condition is correct. Depending on the specific implementation of the system 100 and/or user preferences, autonomous performance of the special function test may proceed directly from the initial user communication or other event that resulted in the presumed diagnosis (e.g., the collection of diagnostic data from the vehicle 10 and/or other corroborating data as described above), independent of further human interaction. In the case of a special function test yielding diagnostic data that refutes a presumed diagnostic condition, the procedure may repeat with a second-most likely diagnostic condition being the new presumed diagnostic condition, followed by a third-most likely diagnostic condition, and so on, with additional special function tests being performed as needed or desired.

As another example, a reliability index may be assigned to the system's determination of a proposed scan tool function to perform as described above. A low reliability index may cause the system 100 to present one or more functions for user confirmation (as in the example operational flow of FIG. 3 and as illustrated in the flow charts of FIGS. 4 and 5A/5B), whereas a high reliability index (e.g., above some threshold) may cause the system 100 to bypass the step of choosing/confirming the function and proceed with instructing the DAT 120 based on a single determined function having high confidence. It is noted, however, that some functions may still require confirmation for safety reasons, even in the case of a high reliability index. For example, some special functional tests (e.g., write-function type) need to be performed under certain conditions such as while the vehicle is stopped. The system 100 may be configured to warn the user of such conditions or any associated effects or dangers rather than bypassing user confirmation in some instances.

Figure 6A:
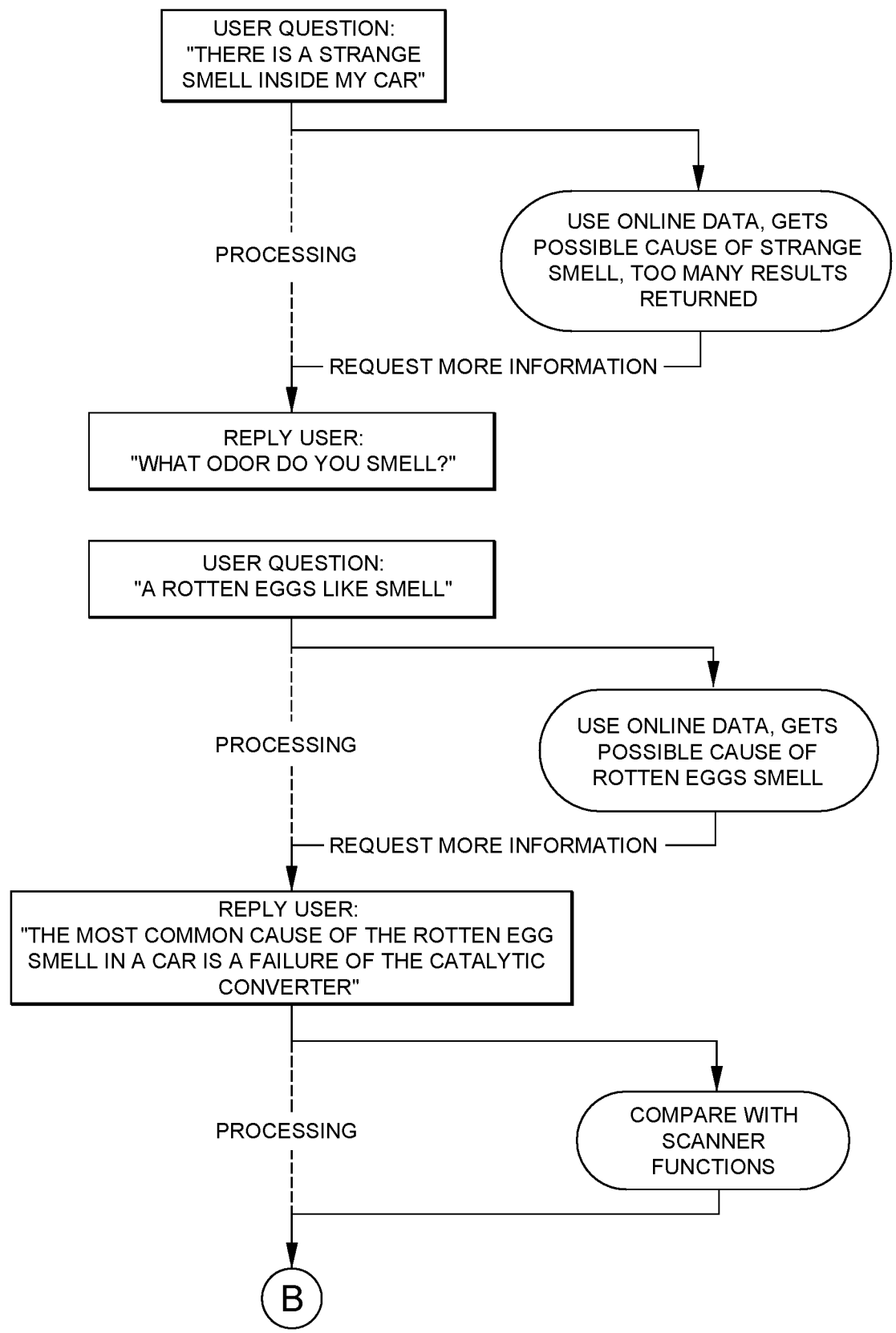
FIG. 6A shows a first part of another flow chart describing an example application of the system of FIG. 1 and/or the operational flow of FIG. 2.
Figure 6B:
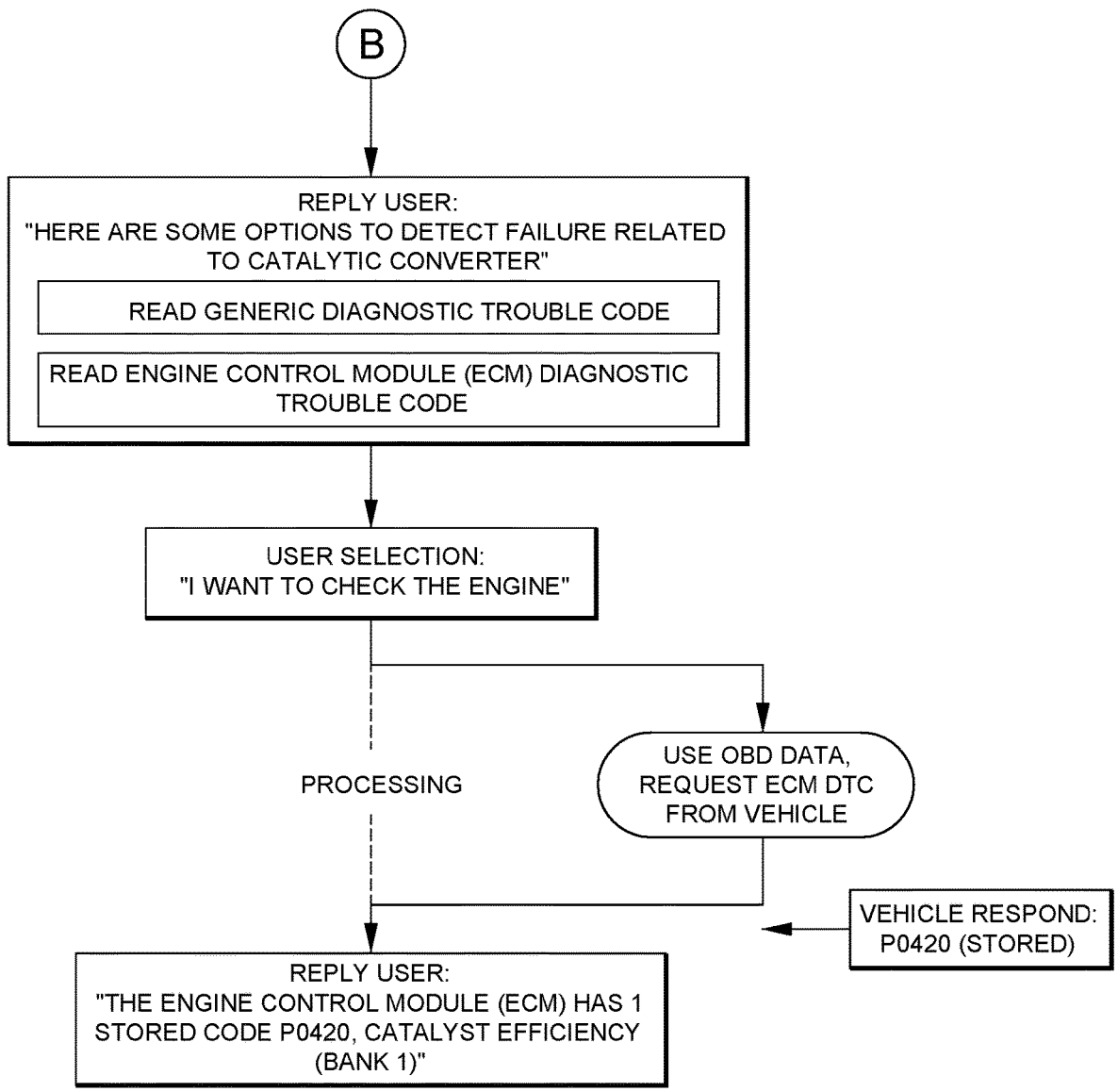
FIG. 6B shows a second part of the flow chart of FIG. 6A.

Another extended example showing an iterative application of the disclosed subject matter is shown in the flow chart of FIGS. 6A and 6B. In this case, the user begins by saying, "There's a strange smell inside my car." Upon processing this initial communication 12 using the NLP model 130, the system 100 may determine that there are too many possible causes for a strange smell and that more information from the user is needed. This may be determined, for example, during step 230 of the operational flow of FIG. 2, where it may be found that too many different keywords associated with different scan tool functions are found in the NLP model output (e.g., the number of extracted keywords or the number of distinct mapped functions is greater than some threshold). Therefore, the system 100 (e.g., the app) may reply verbally to the user, "What odor do you smell?" to get more specific information from the user. The user responds, "A rotten eggs like smell," which is processed using the NLP model 130. The system 100 may, for example, process this new communication 12 using the NLP model 130 while also providing the previous communication 12 ("There's a strange smell inside my car") to the NLP model 130 as a context, such that the combination ("There's a strange smell inside my car. A rotten eggs like smell") may be processed by the NLP model 130 to derive NLP model output. Based on the NLP model output (e.g., based on keywords derived therefrom), the system 100 may inform the user, "The most common cause of the rotten egg smell in a car is a failure of the catalytic converter," and, as shown in FIG. 6B, may propose scan tool functions ("Here are some options to detect failure related to catalytic converter: Read Generic Diagnostic Trouble Code (DTC), Read Engine Control Module (ECM) Diagnostic Trouble Code (DTC)"). In response to a second communication 12 from the user selecting one of the proposed scan tool functions, "I want to check the engine" (which may entail a simple selection from an enumerated menu of options or involve further natural language processing as described above), the system 100 (e.g., the app) may initiate the scan tool function of "request ECM DTC" from the vehicle 10, after which the app may reply to the user to provide the result of the function as shown in FIG. 6B, "The Engine Control Module (ECM) has 1 stored code P0420, Catalyst Efficiency (Bank 1)." To arrive at this result, the mobile device 110 with the installed app may instruct the DAT 120 to request ECM DTC from the vehicle 10 and may communicate with the one or more server(s)/database(s) 140, 150 to upload the DTCs (along with vehicle identifying information derived from the VIN) and translate the DTCs and/or determine an associated diagnostic condition of the vehicle 10 (e.g., for the specific year/make/model/engine/trim).

Figure 7:
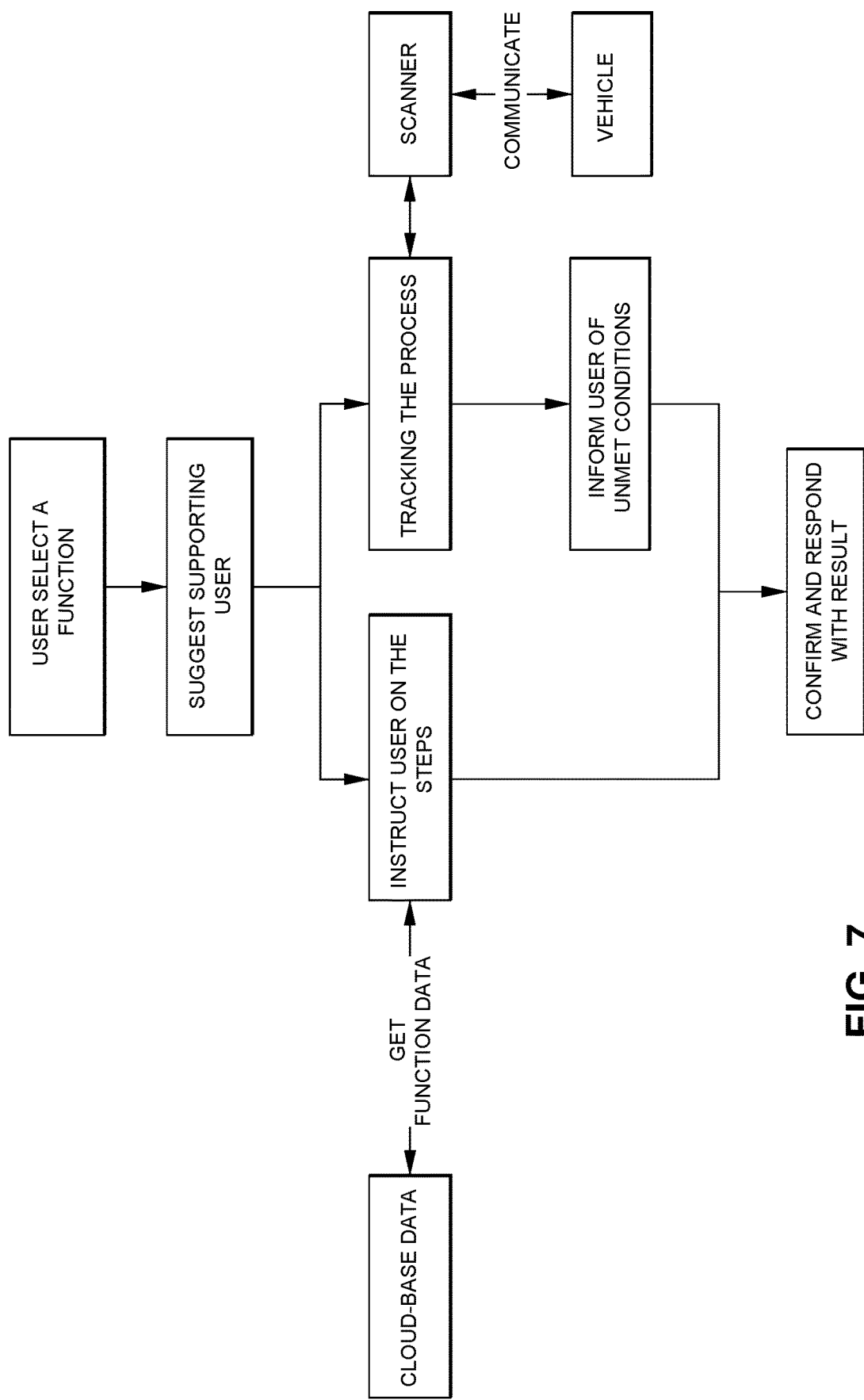
FIG. 7 shows another flow chart describing an example application of the system of FIG. 1 and/or the operational flow of FIG. 2.

FIG. 7 shows another flow chart describing an example application of the system 100 of FIG. 1 and/or the operational flow of FIG. 2. When the user selects a scan tool function (or, alternatively, when the system 100 autonomously determines the function), the system 100 may assist the user with completing the process of the function. For example, the function may require the user to operate the vehicle 10 in a particular way or input the values of various function parameters (e.g., to the app). To this end, the app may retrieve the detailed procedure of the function, such as by communication with the one or more servers 140, and may suggest to the user (e.g., by verbal communication) that the user might receive support to complete the function (e.g., "Would you like assistance with this function?"). After receiving the user's confirmation that assistance is desired, the user may simultaneously instruct the user on the various steps for completing the function while tracking the progress of the process. As needed, the user may converse with the system 100 to ask questions or request additional details, and the system 100 may retrieve function data and any other necessary information from the server(s) 140 with reference to the database(s) 150. Tracking of the function process may be done automatically by virtue of the connection between the DAT 120 and the vehicle 10. As conditions remain unmet for completing the function, the app may inform the user of unmet conditions, finally confirming that the function has been done properly. The app may then respond with the result and any further options as described above. In this way, the user may be in communication with the system 100 at all times, to a degree suitable for each particular user, while setting up and performing complex scan tool functions.

Figure 8A:
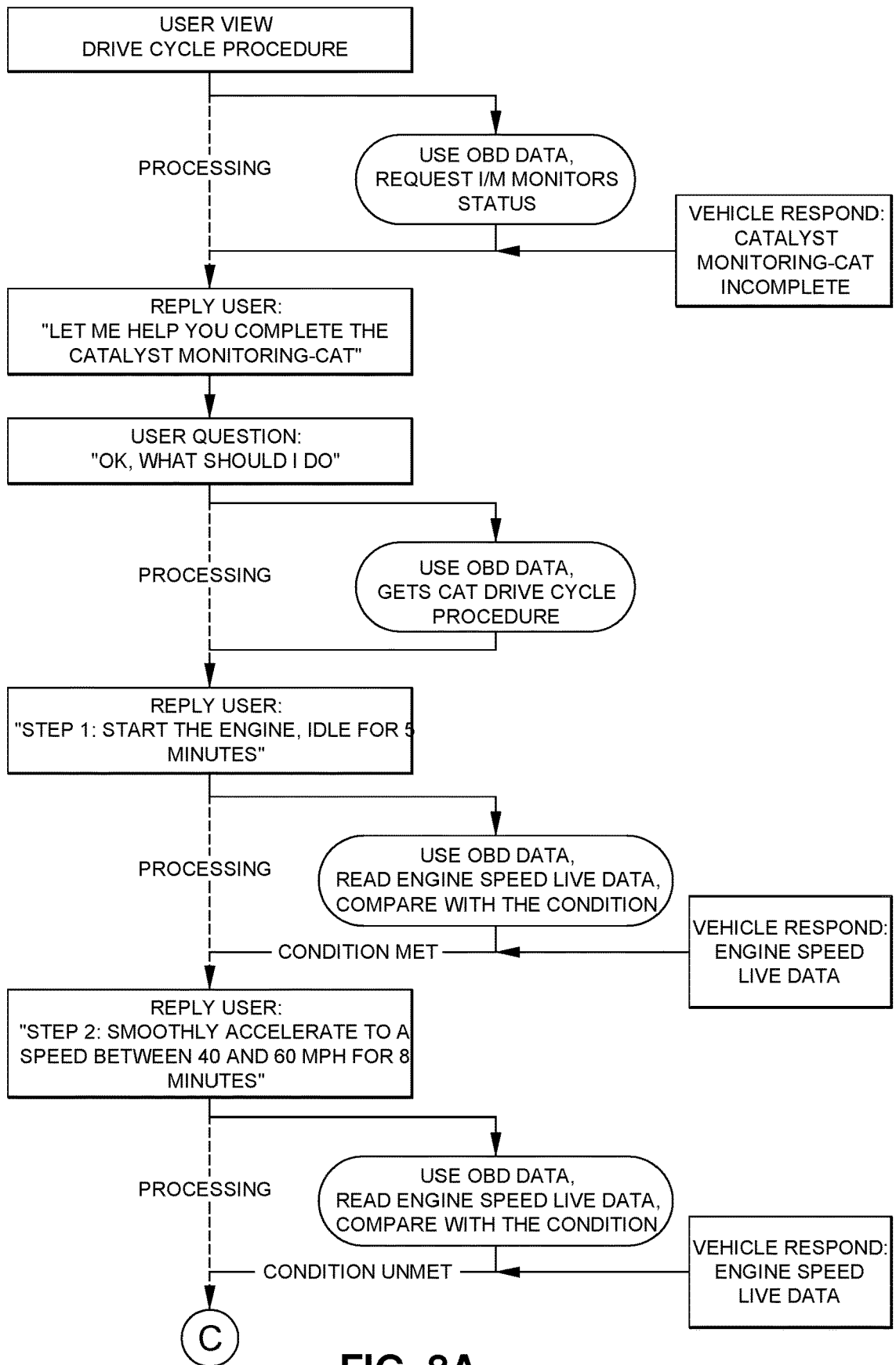
FIG. 8A shows a first part of another flow chart describing an example application of the system of FIG. 1 and/or the operational flow of FIG. 2.
Figure 8B:
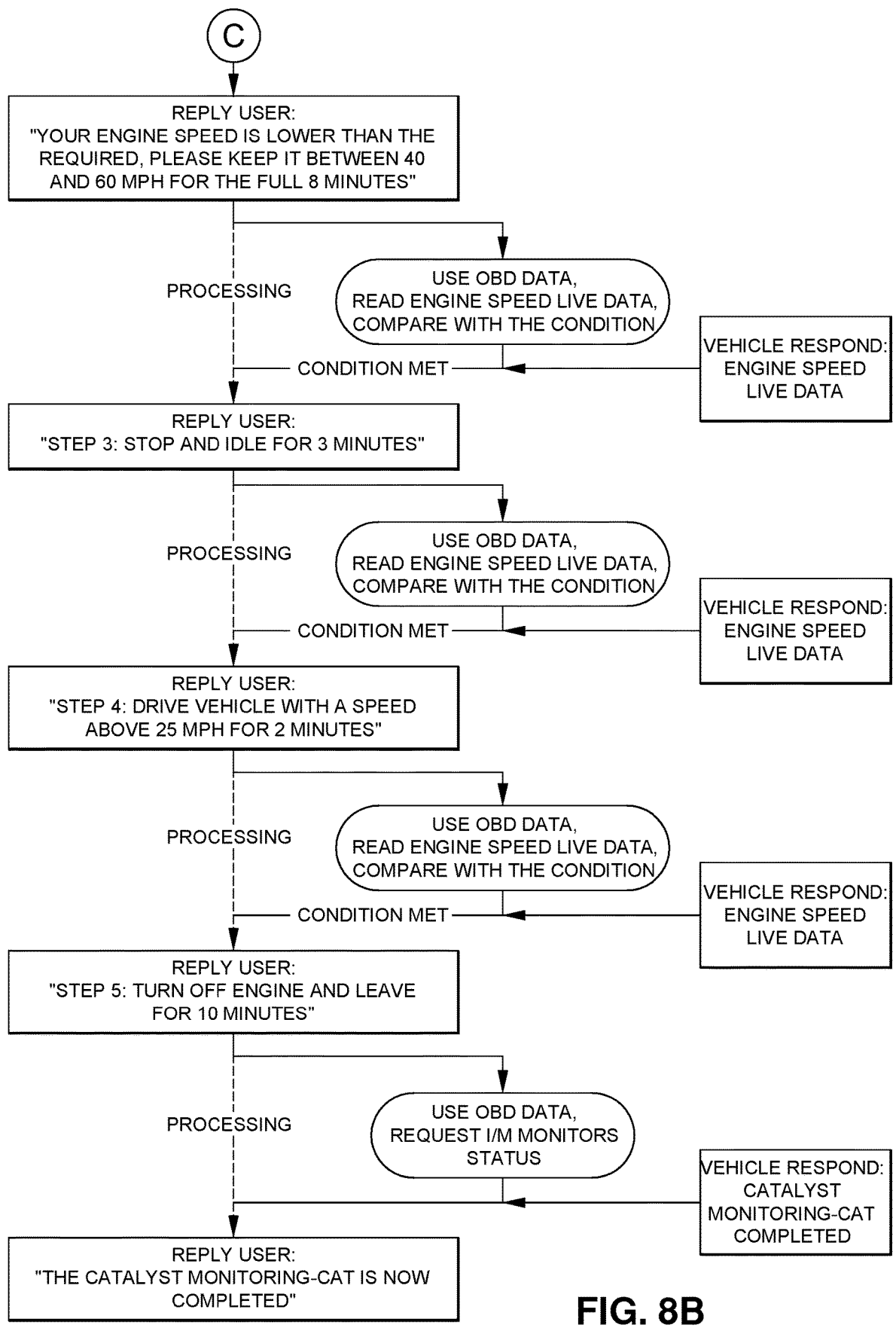
FIG. 8B shows a second part of the flow chart of FIG. 8A.

Another extended example showing an iterative application of the disclosed subject matter is shown in the flow chart of FIGS. 8A and 8B. The example of FIGS. 8A and 8B may represent a specific application of the flow chart of FIG. 7 for a case where the user is to be assisted with driving the vehicle 10 according to specific conditions during performance of a catalyst (CAT) monitoring function. The procedure may begin with the presentation of the drive cycle procedure (e.g., how the vehicle 10 should be driven) to the user as shown. As can be appreciated, it may not be safe to read the procedure while driving. To this end, the system 100 may help read out the procedure step-by-step so that the user can follow along by listening while paying attention to the road. At the same time, the system 100 may monitor completion of each step by checking data received from the vehicle 10 by the DAT 120, informing the user as needed of met/unmet conditions. As shown in FIGS. 8A and 8B, the user may engage in a conversation with the app while the app interfaces with the vehicle 10 via the DAT 120, utilizing the NLP model 130 and/or server(s) 140 as needed as described above.

Figure 9:
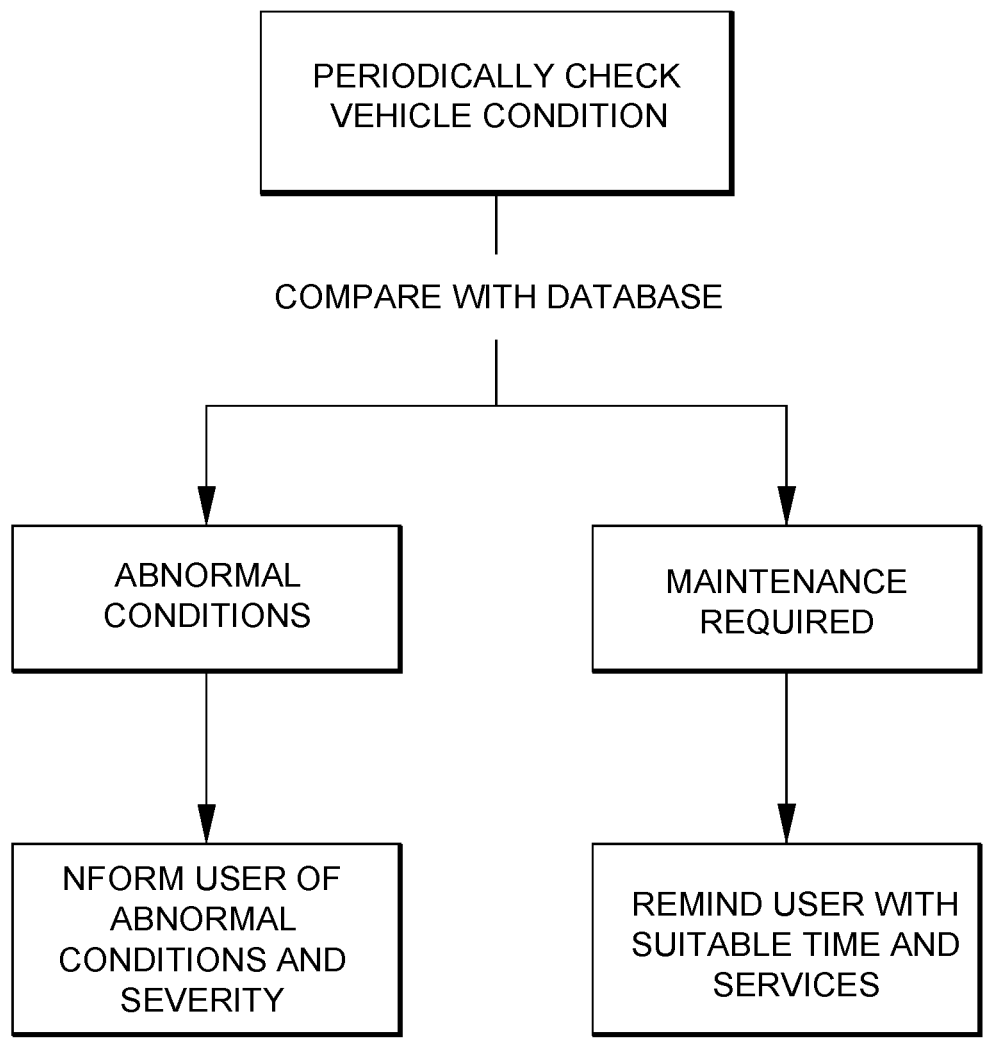
FIG. 9 shows another flow chart describing an example application of the system of FIG. 1 and/or the operational flow of FIG. 2.

FIG. 9 shows another flow chart describing an example application of the system 100 of FIG. 1 and/or the operational flow of FIG. 2. In a case where the DAT 120 is always operatively connected to the vehicle 10 (e.g., a dongle that is always plugged in to the OBD port of the vehicle 10), the system 100 may periodically check the vehicle condition. For example, the app installed on the mobile device 110 may (in accordance with user preferences) autonomously instruct the DAT 120 to regularly perform one or more scan tool functions to check the vehicle condition. The resulting diagnostic data retrieved from the vehicle 10 by the DAT 120 may then be uploaded to the one or more servers 140 for analysis with reference to the one or more diagnostic databases 150. If this procedure reveals an abnormal diagnostic condition of the vehicle 10, the app may communicate with the user as described above to inform the user of the abnormal condition and its severity, along with options for further testing (e.g., additional scan tool functions) and/or recommended repairs and parts. In this way, the flow chart of FIG. 9 may represent another way that the flow charts of FIGS. 4, 5A/5B and 6A/6B may begin, with the system 100 autonomously initiating a dialogue with the user as a problem is discovered, rather than with the user initiating the dialogue as described above. (For example, the flow chart of FIGS. 5A/5B may begin with the system 100 detecting, during a period check, that there is a fault on the engine control module (ECM).) If, on the other hand, the diagnostic data reveals no abnormal condition but only that the vehicle 10 is due (or will soon be due) for regular maintenance, the app may communicate with the user to remind the user and assist the user with scheduling regular maintenance (e.g., which may include directing the user to nearby service centers or presenting contact information of nearby service centers, for example). The system 100 may, for example, read the odometer and remind the user of scheduled maintenance or check the transmission fluid level and inform the user that it is time for a replacement.

In the example of FIG. 1, the system 100 is illustrated as including a distinct mobile device 110 and DAT 120. However, it is contemplated that any or all of the functionality described in relation to the app installed on the mobile device 110 may be combined in a single device that is capable of connecting (by a cable or wirelessly) to the vehicle 10 (e.g., via the OBD port) to perform the scan tool functions described herein, such that the mobile device 110 and DAT 120 may be the same device (e.g., a mobile device 110 with DAT functionality or a DAT 120 with enhanced communication and user interface functionality). Along the same lines, it is contemplated that the NLP model 130 may not necessarily be embodied in a distinct computer and may be resident on the mobile device 110 or DAT 120 in some cases.

In the above examples, it is described that a pretrained machine learning model such as a general purpose chatbot or virtual assistant (e.g., OpenAI's ChatGPT) may serve as the NLP model 130. However, the NLP model 130 need not necessarily be limited in this respect and may, for example, be a scratch-built model that is managed by the same server(s) 140 that have access to the diagnostic database(s) 150. In such an implementation, the inputs to the model might not be limited to natural language and might include diagnostic data including identifying information of the vehicle 10, diagnostic trouble codes (DTCs), etc. Such a model may be trained on a combination of natural language with one or more such additional data features that may provide context for the natural language. Thus, when the mobile device 110 uses the model to process the user's communication 12, instead of providing context in the form of some verbiage (e.g., "in a vehicle") appended to the user's communication 12, the context may be provided to the model as an additional data feature alongside the user's communication 12. In a case where a machine learning model is also used downstream to determine which scan tool feature functions are appropriate, it is contemplated that the methodology may be streamlined as desired by using a combined model. For example, the inputs to the model may be the communication 12 plus OBD data-based context features, and the output may be one or more proposed scan tool functions, such that the generation of keywords from the NLP model output may be omitted.

The functionality described above in relation to the mobile device 110, DAT 120, and server(s) 150 shown in FIG. 1 and the operational flows and flow charts described in relation to FIGS. 2-9 and throughout the disclosure may be wholly or partly embodied in one or more computers including a processor (e.g. a CPU), a system memory (e.g. RAM), and a hard drive or other secondary storage device. The processor may execute one or more computer programs, which may be tangibly embodied along with an operating system in a computer-readable medium, e.g., the secondary storage device. The operating system and computer programs may be loaded from the secondary storage device into the system memory to be executed by the processor. The computer may further include a network interface for network communication between the computer and external devices (e.g., over the Internet), such as between the mobile device 110 and the DAT 120 or between the mobile device 110 or DAT 120 and the server(s) 140 or third-party computer systems associated with the NLP model 130. To the extent that any of the described functionality may be performed by the server(s) 140, the server(s) 140 may comprise multiple physical servers and other computers that communicate with each other to perform the described functionality.

The above computer programs may comprise program instructions which, when executed by the processor, cause the processor to perform operations in accordance with the various embodiments of the present disclosure. The computer programs may be provided to the secondary storage by or otherwise reside on an external computer-readable medium such as a DVD-ROM, an optical recording medium such as a CD or Blu-ray Disk, a magneto-optic recording medium such as an MO, a semiconductor memory such as an IC card, a tape medium, a mechanically encoded medium such as a punch card, etc. Other examples of computer-readable media that may store programs in relation to the disclosed embodiments include a RAM or hard disk in a server system connected to a communication network such as a dedicated network or the Internet, with the program being provided to the computer via the network. Such program storage media may, in some embodiments, be non-transitory, thus excluding transitory signals per se, such as radio waves or other electromagnetic waves. Examples of program instructions stored on a computer-readable medium may include, in addition to code executable by a processor, state information for execution by programmable circuitry such as a field-programmable gate arrays (FPGA) or programmable logic array (PLA).

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A computer program product comprising one or more non-transitory program storage media on which are stored instructions executable by one or more processors or programmable circuits to perform operations for providing vehicle diagnostics, the operations comprising:
   receiving a first communication from a user;
   inputting the first communication to a chatbot;
   receiving a response to the first communication from the chatbot, the response including a sequence of words;
   extracting one or more keywords from the sequence of words; and
   instructing a data acquisition and transfer device (DAT) connected to an OBD port of a vehicle to perform a selected function based on the one or more keywords.

2. The computer program product of claim 1, wherein the operations further comprise:
   receiving diagnostic data from the DAT, the diagnostic data having been retrieved from the vehicle by the DAT in accordance with the selected function; and
   determining a diagnostic condition of the vehicle based on the diagnostic data.

3. The computer program product of claim 2, wherein said determining includes uploading the diagnostic data to one or more servers and receiving the diagnostic condition from the one or more servers.

4. The computer program product of claim 3, wherein the diagnostic condition is derived by the one or more servers based on a historical database of vehicle-specific diagnostic data and associated diagnostic conditions.

5. The computer program product of claim 3, wherein the diagnostic condition is derived by the one or more servers using artificial intelligence (AI).

6. The computer program product of claim 2, wherein the operations further comprise deriving a reliability index associated with the diagnostic condition.

7. The computer program product of claim 6, wherein the operations further comprise, in response to the reliability index being below a threshold, instructing the DAT to perform a special function test, the special function test being configured to generate additional diagnostic data that supports or refutes the determined diagnostic condition.

8. The computer program product of claim 6, wherein the operations further comprise, in response to the reliability index being below a threshold, presenting to the user an option to instruct the DAT to perform a special function test, the special function test being configured to generate additional diagnostic data that supports or refutes the determined diagnostic condition.

9. The computer program product of claim 2, wherein the diagnostic condition of the vehicle comprises an indication of a repair solution.

10. The computer program product of claim 2, wherein the diagnostic condition of the vehicle comprises an indication of a replacement part.

11. The computer program product of claim 1, wherein said processing includes supplementing the first communication with a context related to the vehicle.

12. The computer program product of claim 11, wherein the context includes identifying information of the vehicle.

13. The computer program product of claim 1, wherein the operations further comprise:
    determining one or more proposed functions based on the one or more keywords;
    receiving a second communication from a user; and
    processing the second communication to determine the selected function from among the one or more proposed functions.

14. The computer program product of claim 13, wherein said determining includes mapping the one or more keywords to the one or more proposed functions.

15. The computer program product of claim 13, wherein said determining includes inputting the one or more keywords to a machine learning model whose output indicates the one or more proposed functions.

16. The computer program product of claim 13, wherein the one or more proposed functions includes a special function test.

17. The computer program product of claim 16, wherein the operations further comprise presenting a presumed diagnostic condition to the user, the special function test being configured to generate additional diagnostic data that supports or refutes the presumed diagnostic condition.

18. The computer program product of claim 1, further comprising determining the selected function by mapping the one or more keywords to the selected function.

19. The computer program product of claim 1, further comprising determining the selected function by inputting the one or more keywords to a machine learning model whose output indicates the selected function.

20. A system comprising:
    the computer program product of claim 1; and
    a mobile device, wherein the mobile device includes the one or more processors or programmable circuits.

21. The system of claim 20, wherein the DAT is a dongle communicatively coupled with the mobile device.

22. The system of claim 20, wherein the operations further comprise:
    receiving diagnostic data from the DAT, the diagnostic data having been retrieved from the vehicle by the DAT in accordance with the selected function; and
    determining a diagnostic condition of the vehicle based on the diagnostic data.

23. The system of claim 22, wherein the diagnostic condition is derived by the mobile device based on a historical database of vehicle-specific diagnostic data and associated diagnostic conditions.

24. The system of claim 22, wherein the diagnostic condition is derived by the mobile device using artificial intelligence (AI).

25. A system comprising:
the computer program product of claim 1; and
the DAT, wherein the DAT includes the one or more processors or programmable circuits.

26. The system of claim 25, wherein the operations further comprise:
receiving diagnostic data from the DAT, the diagnostic data having been retrieved from the vehicle by the DAT in accordance with the selected function; and
determining a diagnostic condition of the vehicle based on the diagnostic data.

27. The system of claim 26, wherein the diagnostic condition is derived by the DAT based on a historical database of vehicle-specific diagnostic data and associated diagnostic conditions.

28. The system of claim 26, wherein the diagnostic condition is derived by the DAT using artificial intelligence (AI).

29. A method of providing vehicle diagnostics, the method comprising:
receiving a first communication from a user;
inputting the first communication to a chatbot;
receiving a response to the first communication from the chatbot, the response including a sequence of words;
extracting one or more keywords from the sequence of words; and
instructing a data acquisition and transfer device (DAT) connected to an OBD port of a vehicle to perform a selected function based on the one or more keywords.

30. A system for providing vehicle diagnostics, the system comprising:
a mobile device operable to receive a first communication from a user, input the first communication to a chatbot, receive a response to the first communication including a sequence of words from the chatbot, and extract one or more keywords from the sequence of words; and
a data acquisition and transfer device (DAT) in communication with the mobile device and connected to an OBD port of a vehicle, the DAT being operable to perform a selected function based on the one or more keywords.

31. A system for providing vehicle diagnostics, the system comprising:
one or more servers operable to receive a first communication from a user, input the first communication to a chatbot, receive a response to the first communication including a sequence of words from the chatbot, and extract one or more keywords from the sequence of words; and
a data acquisition and transfer device (DAT) in communication with the one or more servers and connected to an OBD port of a vehicle, the DAT being operable to perform a selected function based on the one or more keywords.

* * * * *